US011599364B2

United States Patent
Hamlin et al.

(10) Patent No.: US 11,599,364 B2
(45) Date of Patent: Mar. 7, 2023

(54) SYSTEM AND METHOD FOR PROVIDE PERSISTENT COMPANION SOFTWARE IN AN INFORMATION HANDLING SYSTEM

(71) Applicant: DELL PRODUCTS, LP, Round Rock, TX (US)

(72) Inventors: Daniel L. Hamlin, Round Rock, TX (US); Mandy C. Phelps, Georgetown, TX (US); Danilo O. Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 17/183,105

(22) Filed: Feb. 23, 2021

(65) Prior Publication Data

US 2022/0269510 A1    Aug. 25, 2022

(51) Int. Cl.
*G06F 9/4401* (2018.01)
*G06F 8/61* (2018.01)

(52) U.S. Cl.
CPC .............. *G06F 9/4411* (2013.01); *G06F 8/61* (2013.01)

(58) Field of Classification Search
CPC ................................ G06F 9/4411; G06F 8/61
See application file for complete search history.

(56) References Cited

U.S. PATENT DOCUMENTS

| 8,978,075 | B1* | 3/2015 | Kaiser | H04N 21/4722 725/62 |
| 9,274,674 | B2 | 3/2016 | Moromisato et al. | |
| 10,606,564 | B2 | 3/2020 | Gordner et al. | |
| 10,754,667 | B1* | 8/2020 | Cu-Unjieng | G06F 9/44521 |
| 2002/0095501 | A1* | 7/2002 | Chiloyan | H04L 67/04 709/227 |
| 2004/0268368 | A1* | 12/2004 | Doran | G06F 21/554 719/321 |
| 2007/0234024 | A1* | 10/2007 | Lu | G06F 21/575 713/1 |
| 2018/0027301 | A1* | 1/2018 | Deshpande | H04N 21/6405 725/88 |
| 2019/0073285 | A1* | 3/2019 | Hayashida | G06F 11/2221 |
| 2019/0347084 | A1* | 11/2019 | Satam | G06F 8/61 |
| 2020/0404076 | A1* | 12/2020 | Mahadevan | H04L 67/34 |

OTHER PUBLICATIONS

Brouwer, A. (Jul. 7, 2009). Keyboard scancodes. Retrieved Jul. 26, 2022, from https://www.win.tue.nl/~aeb/linux/kbd/scancodes.html (Year: 2009).*

\* cited by examiner

*Primary Examiner* — Aurel Prifti
(74) *Attorney, Agent, or Firm* — Larson Newman, LLP

(57) ABSTRACT

An information handling system includes a device, a driver associated with the device, and a BIOS. The device provides first information associated with a first function and second information associated with a companion application. The BIOS receives the first and second information. The BIOS includes a procedure to implement the first function, but lacks a procedure to implement the second function. The BIOS sends the second input information to the driver. The driver determines that the companion application is instantiated on the information handling system and directs the second information to the companion application, and the driver determines that the companion application is not instantiated on the information handling system, accesses a network to install the companion application, and directs the second information to the companion application.

20 Claims, 2 Drawing Sheets

SYSTEM AND METHOD FOR PROVIDE PERSISTENT COMPANION SOFTWARE IN AN INFORMATION HANDLING SYSTEM

FIELD OF THE DISCLOSURE

This disclosure generally relates to information handling systems, and more particularly relates to providing persistent companion software in an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a device, a driver associated with the device, and a BIOS. The device may provide first information associated with a first function and second information associated with a companion application. The BIOS may receive the first and second information. The BIOS may include a procedure to implement the first function, but may lack a procedure to implement the second function. The BIOS may send the second input information to the driver. The driver may determine that the companion application is instantiated on the information handling system and directs the second information to the companion application. The driver may further determine that the companion application is not instantiated on the information handling system, access a network to install the companion application, and direct the second information to the companion application

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
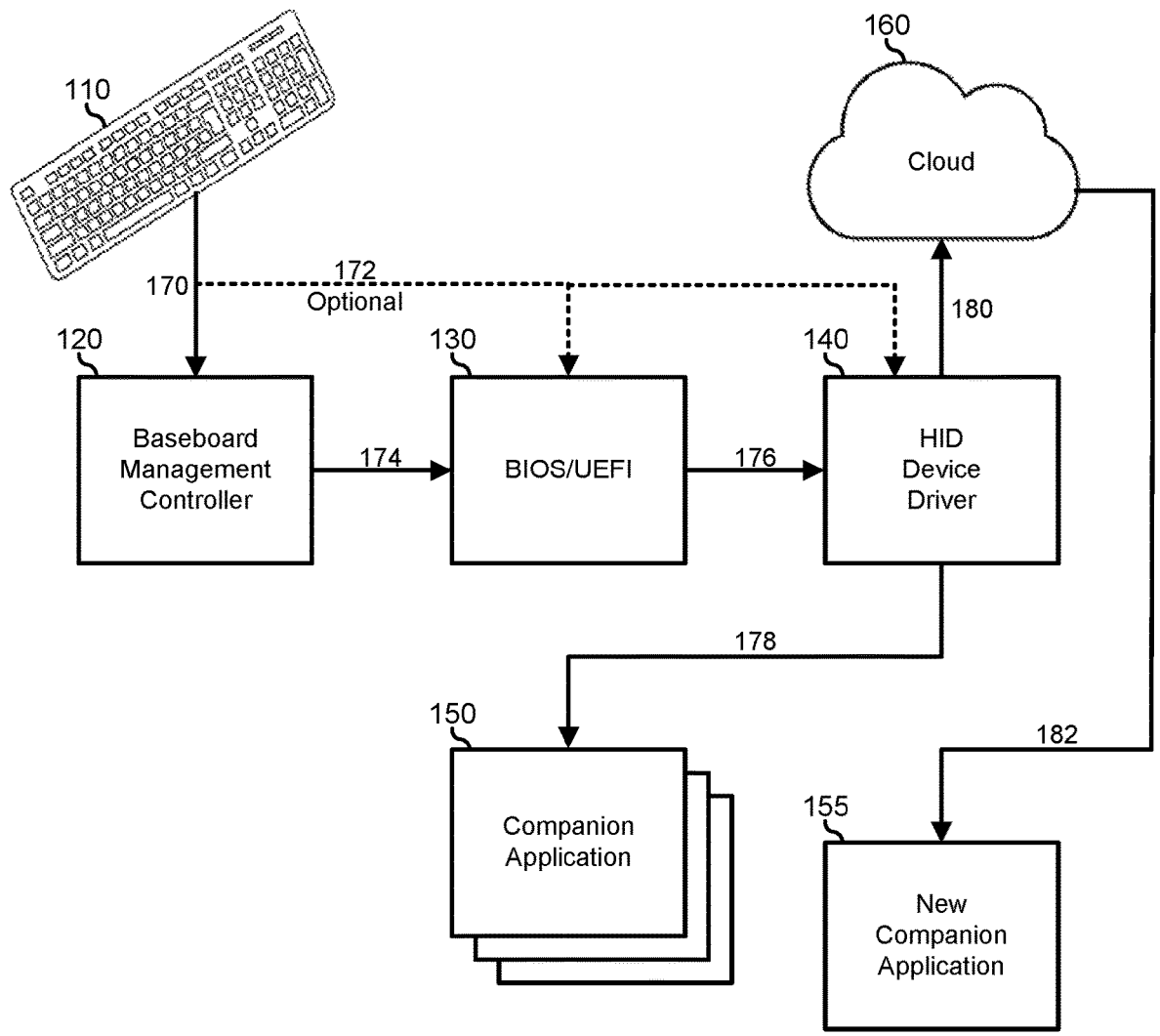
FIG. 1 is a block diagram illustrating an information handling system, and a method for providing persistent companion software therein, according to an embodiment of the current disclosure.

FIG. 1 illustrates an information handling system 100 including a human interface device (HID) 110, a baseboard management controller (BMC) 120, a Basic Input/Output System or Universal Extensible Firmware Interface (BIOS/UEFI) 130, a HID device driver 140, companion applications 150, and a cloud network 160. As depicted in FIG. 1, HID 110 represents a keyboard device, but that is not necessarily so. In general, HID 110 may be understood to represent a wide variety of HID devices, such as a mouse, a trackball device, a notepad interface, or another HID device, as needed or desired. Still more generally, HID 110 need not be understood to represent only a HID device, but may be understood to represent other types of devices that can be associated with a computer system, such as a scanner, a printer, a monitor, or other types of devices. In a particular embodiment, HID 110 may be representative of any such device associated with a computer system, and that has custom interfaces, such as keyboard keys, buttons, or the like, that are intended by a manufacturer of the device to be associated with one or more companion computer applications. For example, HID 110 may represent a computer keyboard with various custom keys in addition to the traditional QWERTY keys normally associated with a computer keyboard, such as where a computer keyboard includes separate media access and control keys, volume knobs, and the like. Here, a typical keyboard driver may be configured to receive a scan code for the custom keys, but may ascribe no function to such custom keys. Here, the typical keyboard driver may provide no indication whatsoever of a user's interaction with such custom keys. As such, HID 110 may most broadly be understood to represent any type of computer peripheral that includes custom interfaces, such as keys, knobs, sliders, buttons, or the like, that are intended by the manufacturer to be associated with a particular program or application, but for which a standard driver for such a computer peripheral ascribes no functionality to such custom interfaces.

BMC 120 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, BMC 120 is configured to receive inputs from HID 110. Here, as described further below with respect to FIG. 2, BMC 120 may be provided with power to manage information handling system 100 when the information handling system is otherwise powered down. For this reason, in the illustrated embodiment of FIG. 1, BMC 120 is configured to receive scan codes from a keyboard so that the BMC may utilize the keyboard prior to a boot process of information handling system 100. Then, when information handling system 100 is in the system boot process, BMC 120 is configured to forward received inputs from HID 110 to BIOS/UEFI 130. In an alternative embodiment, HID 110 may provide input information directly to BIOS/UEFI 130, as illustrated by the dashed line in FIG. 1. In this regard, BIOS/UEFI 130 represents code instantiated on information handling system 100 that is executed to initialize the information handling system during a boot phase of operation, to pass operation to an operating system instantiated on the information handling system, and to provide service and procedure calls for accessing various functions and features of the information handling system during a run time phase of operation. BIOS/UEFI 130 may be understood to include a native capability to operate transactions to and from HID 110. In this capacity, BIOS/UEFI 130 may be further understood to operate a basic set of features related to HID 110. Here, for example, in the illustrated embodiment where HID 110 represents a keyboard, BIOS/UEFI 130 may be understood to be able to correctly interpret standard QWERTY keyboard scan code inputs (alpha-numeric keys, function keys, and the like). However, various other custom functions and features of HID 110 may not necessarily be within the functionality of BIOS/UEFI 130. For example, scan code inputs associated with custom keys on a specialized keyboard may not be recognizable by BIOS/UEFI 130. When BIOS/UEFI 130 receives input information from HID 110 that is not recognized by the BIOS/UEFI, the BIOS/UEFI forwards the input information to HID device driver 140.

HID device driver 140 represents code instantiated on information handling system 100 that operates to control HID 110, providing an interface to the HID and enabling an operating system and other programs or applications instantiated on the information handling systems to access the functions and features of the HID, without the need for the operating system, programs, or applications to implement the detailed protocols and signaling needed to operate the HID. For example, in the illustrated embodiment of FIG. 1, HID device driver 140 operates to receive scan codes from the keyboard for both traditional QWERTY keys normally associated with a computer keyboard, and from the various custom keys provided in addition to the traditional QWERTY keys. Here, the scan codes associated with the traditional QWERTY keys are implemented by HID device driver 140 in accordance with their traditional uses. However, the scan codes associated with the various custom keys are processed by HID device driver 140 with an implementation that associates the various custom keys with one or more of companion applications 150. For example, where a computer keyboard includes separate media access and control keys, volume knobs, and the like, HID device driver 140 may implement a mapping of the associated scan codes with a particular application, such as a media player or the like.

Cloud network 160 represents an external resource to information handling system 100 the provides data storage and computing capabilities available on an on-demand basis. In a particular embodiment, cloud network 160 represents a data storage and computing capability associated with a manufacturer of HID 110, and the data storage and computing capability represents an availability to download device drivers, such as HID device driver 140. Here, when a custom key is activated on HID 110, the input information can be provided to BIOS/UEFI 130, and, when the BIOS/UEFI determines that the input information is unrecognized by the BIOS/UEFI, then the BIOS/UEFI operates to access cloud network 160 to download HID device driver 140. In another embodiment, cloud network 160 represents a data storage and computing capability associated with vendors of companion applications, such as companion applications 150. Here, as noted above, HID device driver 140 is operable to recognize input information from HID 110 that results from the activation of custom keys and to associate such input information with a particular one or more of companion applications 150. Thus, when HID device driver 140 receives the input information from HID 110, then the HID device driver correctly forwards the input information to the associated one or more companion applications 150. In a particular embodiment, HID device driver 140 operates to detect if a companion application that is associated with a particular custom key is instantiated on information handling system 100. If not, HID device driver 140 operates to request the companion application that is associated with the custom key to be downloaded onto information handling system 100 from cloud network 160.

FIG. 1 further illustrates a method for providing persistent companion software in information handling system 100. Here, a custom key is activated on HID 110 and the input information from the activation of the custom key is sent to BMC 120 in step 170. In an alternative step 172, the input information from the activation of the custom key of HID 110 is provided directly to one of BIOS/UEFI 130 and HID device driver 140. BMC 120 determines if the input information is associated with activities of the BMC, and if not, forwards the input information to BIOS/UEFI 120 in step 174. BIOS/UEFI 130 determines if the input information is associated with activities of the BIOS/UEFI, and if not, forwards the input information to HID device driver 140 in step 176. HID device driver 140 determines if a companion application associated with the input information is instantiated on information handling system 100. For example, HID device driver 140 can send the input information to a register or memory location associated with the associated companion application and wait to receive an acknowledgement from the companion application, as shown in step 178. If HID device driver 140 does not receive an acknowledgement from the associated companion application, the HID device driver can infer that the companion application is not instantiated on information handling system 100. Here, HID device driver 140 operates to send a request to cloud network 160 in step 180. Here, the request from HID device driver 140 to cloud network 160 may include a request to download the missing companion application in step 180, to install the missing companion application, to execute the missing companion application within the cloud network, or other actions, as needed or desired. In further response to detecting the absence of the associated companion application, HID device driver 140 may operate to provide an indication to a user of information handling system 100 via a display device or the like, indicating that the associated companion application is not available, and directing the user to a location, such as a web site, a FTP site, or the like, to download the application, or to otherwise inform the user that the activation of the custom key is not currently supported on information handling system 100. In any case, when cloud network 160 receives the request, the cloud network operates to download a new companion application 150 to information handling system 100 in step 182.

In a first use case, information handling system 100 may not include HID device driver 140 when a custom key is activated on HID 110. Here, BIOS/UEFI 130 operates to provide an indication to a user of information handling system 100 via a display device or the like. The contents of the indication may depend upon whether or not the particular user has administration rights to information handling system 100, as may be determined, for example, by a privilege level associated with login credentials provided by the particular user. Here, if the user has administrative rights, the indication may state that a driver configured to interpret the input information is not available, and direct the user to a location, such as a website, a FTP site, or the like, to download HID device driver 140. On the other hand, if the user does not have administrative rights, the indication may inform the user that the activation of the custom key is not currently supported on information handling system 100. In another use case, where information handling system 100 includes HID device driver 140 when a custom key is activated on HID 110, but no associated companion application may be available. Here, HID device driver 140 operates to provide an indication to a user of information handling system 100 via a display device or the like. The contents of the indication may again depend upon whether or not the particular user has administration rights to information handling system 100. If the user has administrative rights, the indication may state that a companion application associated with the input information is not available, and direct the user to a location, such as a website, a FTP site, or the like, to download companion application 152. On the other hand, if the user does not have administrative rights, the indication may inform the user that the activation of the custom key is not currently supported on information handling system 100.

Figure 2:
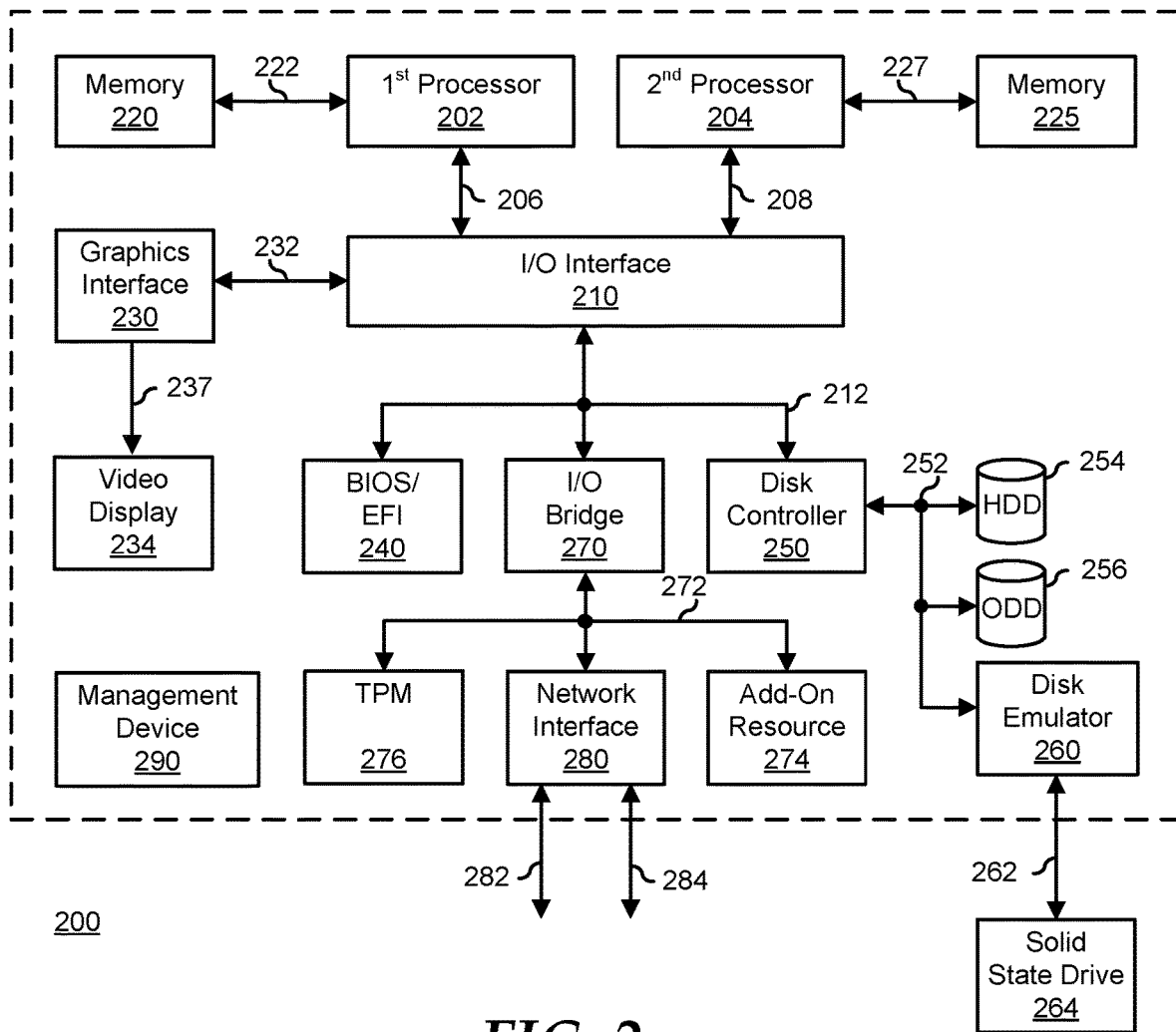
FIG. 2 is a block diagram illustrating a generalized information handling system according to another embodiment of the present disclosure.

FIG. 2 illustrates a generalized embodiment of an information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 262, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256, disk emulator 260, SSD 262, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 230 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 1394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a device configured to provide first input information associated with a first function of the information handling system and second input information associated with a second function of a companion application;
   a Basic Input/Output System (BIOS) configured to receive the first and second input information, wherein the BIOS includes a first procedure to implement the first function, but lacks a second procedure to implement the second function; and
   a device driver associated with the device, wherein the BIOS sends the second input information to the device driver, and wherein in response to receiving the second input information, the device driver is configured to:
      determine that the companion application is instantiated on the information handling system and direct the second input information to the companion application; and
      determine that the companion application is not instantiated on the information handling system, access a network to install the companion application on the information handling system, and direct the second input information to the companion application.

2. The information handling system of claim 1, wherein the device includes a human interface device.

3. The information handling system of claim 2, wherein the human interface device comprises one of a keyboard device.

4. The information handling system of claim 3, wherein the first input information comprises a first key scan code and the second input information comprises a second key scan code.

5. The information handling system of claim 4, wherein the first key scan code represents a QWERTY keyboard scan code.

6. The information handling system of claim 5, wherein the second key scan code does not represent a QWERTY keyboard scan code.

7. The information handling system of claim 2, wherein the human interface device comprises one of a mouse device, a trackball device, and a notepad device.

8. The information handling system of claim 1, further comprising:
   a baseboard management controller configured to receive the first and second input information from the device and to provide the first and second input information to the BIOS.

9. The information handling system of claim 1, wherein, in response to determining that the companion application is not instantiated on the information handling system, the device driver is further configured to determine that a user of the information handling system is authorized to install the companion application.

10. The information handling system of claim 9, wherein installing the companion application on the information handling system is in response to determining that the user is authorized to install the companion application.

11. A method, comprising:
   providing, from a device of an information handling system, first input information associated with a first function of the information handling system and second input information associated with a second function of a companion application;
   receiving, by a Basic Input/Output System of the information handling system, the first and second input information, wherein the BIOS includes a first procedure to implement the first function, but lacks a second procedure to implement the second function;
   implementing the first procedure in response to receiving the first input information;
   receiving, by a device driver associated with the device, the second input information;
   determining that the companion application is instantiated on the information handling system;
   directing the second input information to the companion application in response to determining that the companion application is instantiated on the information handling system;
   determining that the companion application is not instantiated on the information handling system; and
   in response to determining that the companion application is not instantiated on the information handling system:
      accessing a network to install the companion application on the information handling system; and
      directing the second input information to the companion application.

12. The method of claim 11, wherein the device includes a human interface device.

13. The method of claim 12, wherein the human interface device comprises one of a keyboard device.

14. The method of claim 13, wherein the first input information comprises a first key scan code and the second input information comprises a second key scan code.

15. The method of claim 14, wherein the first key scan code represents a QWERTY keyboard scan code.

16. The method of claim 15, wherein the second key scan code does not represent a QWERTY keyboard scan code.

17. The method of claim 11, further comprising:
   a baseboard management controller configured to receive the first and second input information from the device and to provide the first and second input information to the BIOS.

18. The method of claim 11, wherein, in response to determining that the companion application is not instantiated on the information handling system, the device driver is further configured to determine that a user of the information handling system is authorized to install the companion application.

19. The method of claim 18, wherein installing the companion application on the information handling system is in response to determining that the user is authorized to install the companion application.

20. An information handling system, comprising:
   a keyboard device configured to provide a first scan code associated with a first function of the information handling system and second scan code associated with a second function of a companion application;
   a baseboard management controller configured to receive the first and second scan codes from the device;
   a Basic Input/Output System (BIOS) configured to receive the first and second scan codes from the baseboard management controller, wherein the BIOS includes a first procedure to implement the first function, but lacks a second procedure to implement the second function; and
   a device driver associated with the device, wherein the BIOS sends the second scan code to the device driver, and wherein, in response to receiving the second scan code, the device driver is configured to:
      determine that the companion application is instantiated on the information handling system and direct the second input information to the companion application; and
      determine that the companion application is not instantiated on the information handling system, access a network to install the companion application on the information handling system, and direct the second input information to the companion application.

* * * * *